US012274304B2

(12) United States Patent
Wu et al.

(10) Patent No.: US 12,274,304 B2
(45) Date of Patent: Apr. 15, 2025

(54) AEROSOL GENERATING DEVICE

(71) Applicant: SHENZHEN FIRST UNION TECHNOLOGY CO.,LTD., Shenzhen (CN)

(72) Inventors: Tao Wu, Shenzhen (CN); Huanjie He, Shenzhen (CN); Hengkun Zhao, Shenzhen (CN); Junhui Li, Shenzhen (CN); Zhongli Xu, Shenzhen (CN); Yonghai Li, Shenzhen (CN)

(73) Assignee: SHENZHEN FIRST UNION TECHNOLOGY CO., LTD., Shenzhen Guangdong Province (CN)

( * ) Notice: Subject to any disclaimer, the term of this patent is extended or adjusted under 35 U.S.C. 154(b) by 345 days.

(21) Appl. No.: 17/758,463

(22) PCT Filed: Jan. 8, 2021

(86) PCT No.: PCT/CN2021/070918
§ 371 (c)(1),
(2) Date: Jul. 7, 2022

(87) PCT Pub. No.: WO2021/139785
PCT Pub. Date: Jul. 15, 2021

(65) Prior Publication Data

US 2023/0032029 A1 Feb. 2, 2023

(30) Foreign Application Priority Data

Jan. 8, 2020 (CN) ......................... 202020039697.4
Jan. 18, 2020 (CN) ......................... 202020132725.7

(51) Int. Cl.
*A24F 40/465* (2020.01)
*A24F 40/51* (2020.01)
*H05B 6/10* (2006.01)

(52) U.S. Cl.
CPC ............ *A24F 40/465* (2020.01); *A24F 40/51* (2020.01); *H05B 6/105* (2013.01)

(58) Field of Classification Search
None
See application file for complete search history.

(56) References Cited

U.S. PATENT DOCUMENTS 10,791,765 B2 * 10/2020 Li .......................... A24F 40/57
2018/0310622 A1 * 11/2018 Mironov ................ A24F 40/50
(Continued)

FOREIGN PATENT DOCUMENTS

CN 2916422 Y 6/2007
CN 206808677 U 12/2017
(Continued)

*Primary Examiner* — Dennis R Cordray
(74) *Attorney, Agent, or Firm* — Proi Intellectual Property US

(57) ABSTRACT

Provided is an aerosol generating device, comprising: a holder (31), wherein at least a portion of the tubular hollow of the holder forms a chamber (310) to receive a smokable material A; an induction coil (32) arranged on the holder; a susceptor (33) electromagnetically coupled with the induction coil to heat the smokable material A received in the chamber, wherein the susceptor comprises a heating portion (331) and a base portion (332); and a ceramic fixing seat (34) arranged in the holder, wherein the heating portion of the susceptor penetrates the ceramic fixing seat to reach the interior of the chamber, and the base portion abuts against the ceramic fixing seat to fix and maintain the susceptor.

14 Claims, 7 Drawing Sheets

(56) References Cited

U.S. PATENT DOCUMENTS

| | | | | |
|---|---|---|---|---|
| 2019/0230987 | A1* | 8/2019 | Wu | H05B 6/36 |
| 2022/0361576 | A1* | 11/2022 | An | A24F 40/465 |

FOREIGN PATENT DOCUMENTS

| | | | |
|---|---|---|---|
| CN | 209234988 | U | 8/2019 |
| CN | 110250574 | A | 9/2019 |
| CN | 209931492 | U | 1/2020 |
| CN | 211703543 | U | 10/2020 |
| CN | 212117076 | U | 12/2020 |
| EP | 4074197 | A1 | 10/2022 |
| JP | 2013084372 | A2 | 5/2013 |
| JP | 2019134701 | A | 8/2019 |
| KR | 20190093147 | A | 8/2019 |
| WO | 2018190605 | A1 | 10/2018 |
| WO | 2018217054 | A1 | 11/2018 |
| WO | 2019014991 | A1 | 1/2019 |
| WO | 2019030170 | A1 | 2/2019 |

* cited by examiner

AEROSOL GENERATING DEVICE

CROSS REFERENCE TO RELATED APPLICATION(S)

This application claims priorities to prior applications Chinese Patent Application No. 202020039697.4 and Chinese Patent Application No. 202020132725.7.

TECHNICAL FIELD

The embodiment of the present disclosure relates to the technical field of heating nonburning smoking sets, and in particular to an aerosol generating device.

BACKGROUND

Tobacco products (e.g., cigarettes, cigars, etc.) are burning tobaccos to produce tobacco smoke during use. People attempt to make products that release compounds without burning so as to replace these tobacco products burning tobaccos.

An example of this kind of products is a heating device, which heats rather than burns a material to release compounds, for example, the material may be a tobacco product or other non-tobacco products which may contain or not contain nicotine. The patent No. 201821518619.1 of a known technology provides an electromagnetic induction-type heating device, in which an induction heating device is formed employing an induction coil and an induction heating sheet that are coupled with each other. Here, the installation and fixing of the induction heating sheet is achieved by punching the induction heating sheet followed by clamping a clamp protrusion provided on a fixing seat into the hole of the induction heating sheet.

SUMMARY

The embodiment of the present disclosure aims to provide an aerosol generating device which is easier in fixing and assembling of a susceptor, thereby solving the problems, in existing technologies, of the fixing and installation of the induction heater in the induction type heating device.

The present disclosure provides an aerosol generating device, configured to heat a smokable material to generate an aerosol, including:

a holder, which is in the shape of a tube extending in a length direction, at least a portion of a tubular hollow of the holder forming a chamber to receive the smokable material;

an induction coil, which is arranged on the holder and configured to generate a varying magnetic field;

a susceptor, which is configured to be penetrated by the varying magnetic field to generate heat so as to heat the smokable material received within the chamber; the susceptor including a pin or blade shaped heating portion extending at least in part in an axial direction of the chamber and a base portion; and a ceramic fixing seat, which includes a first side facing the chamber and a second side away from the chamber; wherein the heating portion penetrates the ceramic fixing seat from the second side towards the first side and extends at least in part to an interior of the chamber, and the base portion abuts against the ceramic fixing seat to prevent the susceptor from moving within the holder.

In a more preferred embodiment, a separation portion that extends in a radial direction is arranged within the holder, to separate the tubular hollow of the holder into a first portion and a second portion that are located at two opposite sides of the separation portion in the axial direction; wherein the first portion is configured as the chamber to receive the smokable material; and the base portion of the susceptor is accommodated within the second portion.

In a more preferred embodiment, the ceramic fixing seat is arranged within the second portion and abuts against the separation portion.

In a more preferred embodiment, the susceptor does not contact the holder.

In a more preferred embodiment, the separation portion is in the shape of a ring;

the ceramic fixing seat is in the shape of a cylinder extending in an axial direction of the holder and includes a first section close to the chamber and a second section away from the chamber; the first section has a smaller outer diameter than the second section;

the first section extends at least in part to an interior of a ring middle hole of the separation portion, and the second section abuts against the separation portion.

In a more preferred embodiment, a surface of the first section opposite to the chamber is aligned to a surface of the separation portion opposite to the chamber.

In a more preferred embodiment, a temperature sensor that is configured to sense a temperature of the susceptor is further arranged within the second portion; and the temperature sensor is arranged on one side of the base potion away from the chamber and abuts against the base portion.

In a more preferred embodiment, an elastomer is further arranged within the second portion and configured to provide an elastic force so that the temperature sensor abuts against the base portion.

In a more preferred embodiment, an end portion of the holder close to the second portion is further provided with an end cover that is configured to provide support for the elastomer.

In a more preferred embodiment, the temperature sensor further includes an elongated conductive pin;

the end cover defines an opening for the conductive pin to penetrate through to reach an exterior of the holder.

In a more preferred embodiment, a spring is further arranged within the second portion and the spring is configured to provide elastic support for the elastomer so that the elastomer abuts against the temperature sensor.

In a more preferred embodiment, the spring is configured as a spiral and extends in the axial direction of the holder;

the second portion is further provided with a support seat that is located between the elastomer and the spring in the axial direction of the holder, and the elastomer is retained on the support seat;

the spring abuts against the support seat so as to provide elastic support for the elastomer.

In a more preferred embodiment, a temperature sensor, an elastomer and a spring are further arranged within the holder, wherein the temperature sensor is installed on one side of the base portion away from the chamber and abuts against the base portion to sense the temperature of the susceptor;

the elastomer is configured to provide an elastic force so that the temperature sensor abuts against the base portion; and the spring is configured to provide elastic support for the elastomer so that the elastomer abuts against the temperature sensor.

By using the aerosol generating device of the present disclosure, the susceptor is fixed in the holder by means of the ceramic fixing seat, and the susceptor abuts against the ceramic fixing seat in a penetrating manner, such that assembly thereof is convenient; furthermore, the ceramic fixing seat can prevent heat generated by the susceptor from being directly transferred to the holder by means of contact conduction, and as such, heat insulation can be effectively performed on the susceptor.

BRIEF DESCRIPTION OF THE DRAWINGS

One or more embodiments are illustrated through the image(s) in corresponding drawing(s). These illustrations do not form restrictions to the embodiments. Elements in the drawings with a same reference number are expressed as similar elements, and the images in the drawings do not form proportional restrictions unless otherwise stated.

DETAILED DESCRIPTION

To make the purpose, the technical scheme and the advantages of the embodiments of the present disclosure more apparent and understandable, a clear and complete description is provided to the technical scheme in the embodiments of the present disclosure in conjunction with the drawings in the embodiments of the present disclosure. Obviously, the embodiments described hereinafter are simply part embodiments of the present disclosure, but all the embodiments. It should be understood that the specific embodiments described below are merely to illustrate, but to limit, the present disclosure. All other embodiments obtained by those skilled in the art based on the embodiments in the present disclosure without creative work are intended to be included in the scope of protection of the present disclosure.

It is to be noted that when an element is described as "fixed on" another element, it may be directly on the another element, or there might be one or more intermediate elements between them. When one element is described as "connected to" another element, it may be directly connected to the another element, or there might be one or more intermediate elements between them. Terms "vertical", "horizontal", "left", "right" and similar expressions used in this description are merely for the purse of illustration.

In addition, technical features involved in different embodiments of the present disclosure described below may be combined mutually if no conflict is incurred.

One embodiment of the present disclosure provides an aerosol generating device which heats rather than burns a smokable material such as a cigarette, so that at least one ingredient of the smokable material is volatilized or released to form an aerosol for inhalation.

Figure 1:
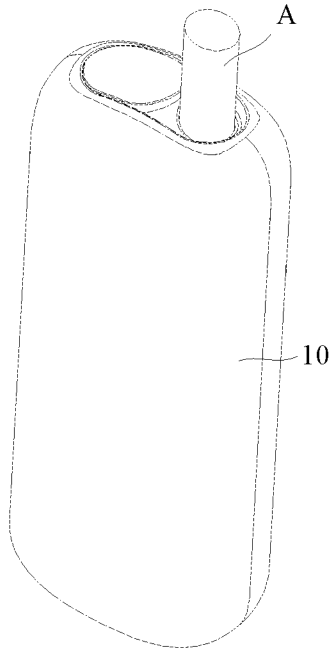
FIG. 1 is a structural diagram of an aerosol generating device according to one embodiment.
Figure 2:
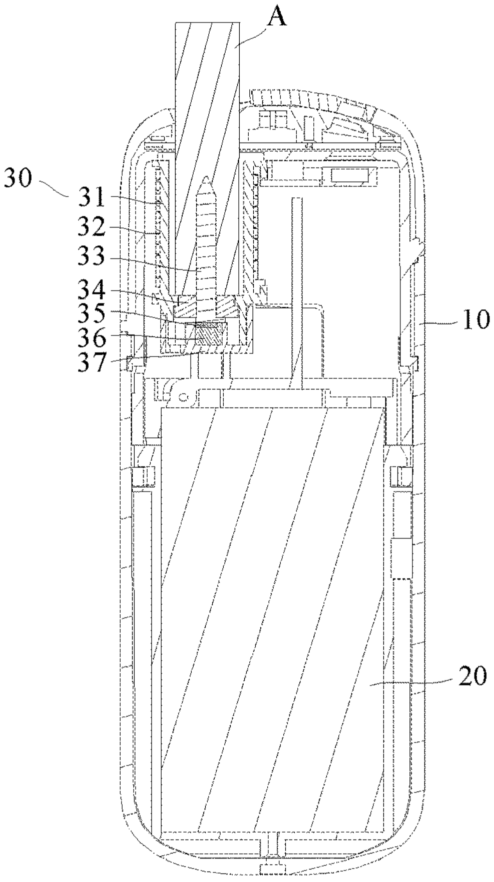
FIG. 2 is a sectional view of the aerosol generating device shown in FIG. 1.

The aerosol generating device according to one embodiment of the present disclosure can refer to FIG. 1 to FIG. 2 in structure, the overall shape of the device is roughly configured as a tabular tube, and external components of the aerosol generating device include:

- a shell 10, which is configured to be hollow inside, thereby forming an assembly space for necessary functional components such as electromagnetic induction heating; and
- a smokable material A, which may be removably received within the shell 10 through a receiving hole on an upper end of the shell 10.

Further, referring to FIG. 2, inside the shell 10 are provided a battery cell 20 configured to supply power and a heating mechanism 30 configured to heat the smokable material received within the shell 10 in an electromagnetic induction mode.

Figure 3:
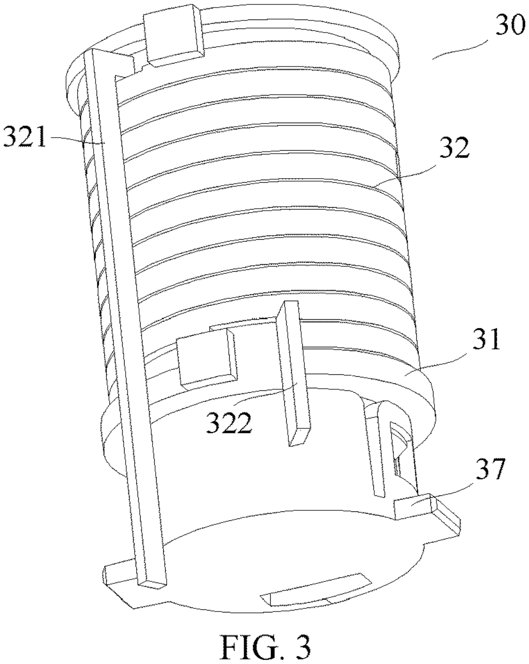
FIG. 3 is a perspective view, from an angle of view, of a heating mechanism shown in FIG. 2.
Figure 4:
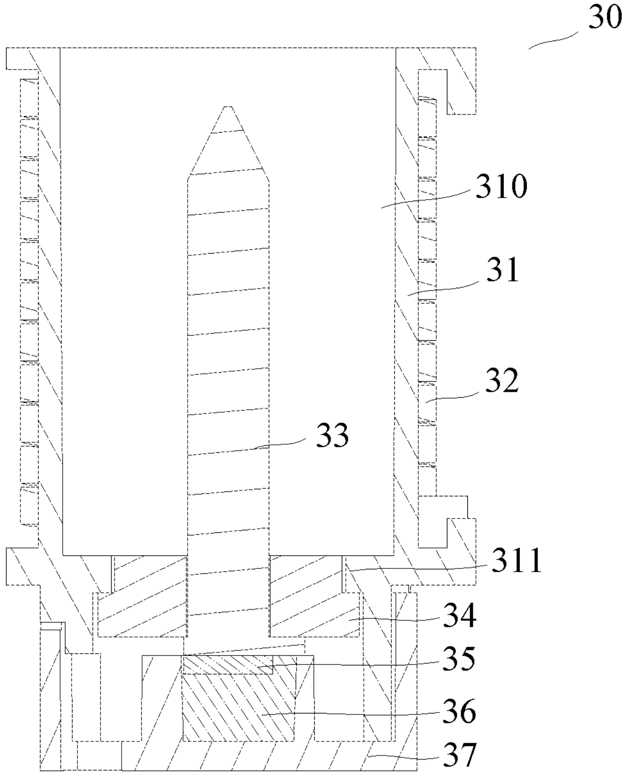
FIG. 4 is a sectional view of the heating mechanism shown in FIG. 3.
Figure 5:
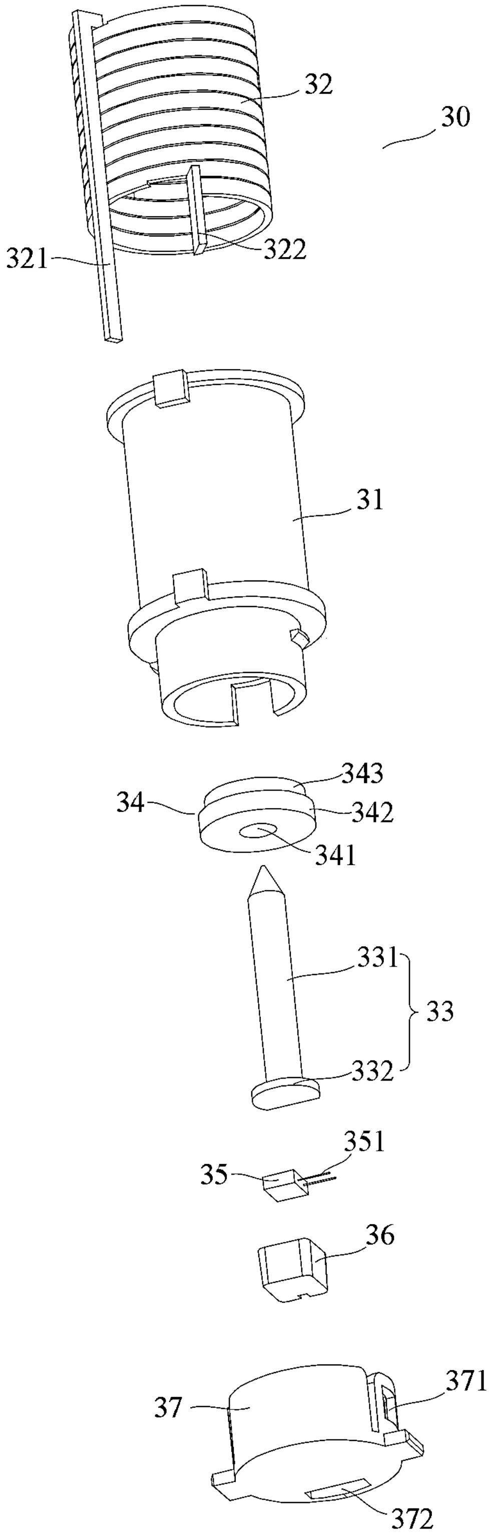
FIG. 5 is an exploded view, before assembly, of each part of the heating mechanism shown in FIG. 3.

Specifically, referring to FIG. 3 to FIG. 5, the heating mechanism 30 includes:

- a holder 31, which on the whole is roughly in the shape of a tube, wherein at least a portion of an inner space of the holder is configured as a chamber 310 to receive the smokable material A;
- the holder 31 is wound with an induction coil 32; two ends of the induction coil 32 are provided, respectively, with a first conductive portion 321 and a second conductive portion 322 configured to supply power to the induction coil 32, and through the first conductive portion 321 and the second conductive portion 322 an alternating current may be supplied to the induction coil 32, so that the induction coil 32 generates an alternating magnetic field.

Further, based on the preferred embodiments shown in FIG. 4 and FIG. 5, the induction coil 32 is a spiral coil, and a cross section of the induction coil 32 is in the shape of a square, specifically, as shown in FIG. 4, the size in the axial direction is greater than the size in the radial direction.

The holder 31 is provided internally with a separation portion 311 that extends inwards from an inner surface in a radial direction, and the separation portion 311 separates the tubular hollow of the holder 31 into a chamber 310 located above and an installation space 320 located below.

Further, the holder 31 is provided internally with a susceptor 33 inductively coupled with the induction coil 32; the susceptor 33 is penetrated by the alternating magnetic field generated by the induction coil 32 to generate heat so as to heat the smokable material A received within the chamber 310. Specifically,

- the susceptor 33 includes a pin or blade shaped heating portion 331 extending in an axial direction of the chamber 310, and a base portion 332 configured to fix and install the susceptor 33 within the installation space 320; in the preferred embodiments shown in FIG. 4 and FIG. 5, the base portion 332 extends along a cross section of the heating portion 331 and has a greater outer diameter than the heating portion 331, so that the susceptor 33 is easy to be fixed.

A ceramic fixing seat 34, which is accommodated within the installation space 320 and abuts against the separation portion 311; according to the preferred embodiments shown in FIG. 4 and FIG. 5, the ceramic fixing seat 34 is roughly in the shape of a cylinder of two sections different in outer diameter size, specifically, a first section 342 with a bigger size and a second section 343 with a smaller size, and a through hole 341 penetrating through the first section 342 and the second section 343 in the axial direction; in the state, after installation, shown in FIG. 4, the second section 343 extends to an interior of a middle hole 315 of the separation portion 311, and an upper end of the first section 342 abuts against the separation portion 311; the through hole 341 is configured to allow the heating portion 331 of the susceptor 33 to penetrate into the chamber 310 from the installation space 320.

The ceramic fixing seat 34 may effectively insulate the heat of the susceptor 33, preventing the heat generated by the susceptor 33 from being directly transferred to the holder 31, which is made of materials such as polymer, resin, etc., by means of contact conduction to lead to high-temperature deformation or damage of the holder 31 In a more preferred embodiment, the ceramic fixing seat 34 is made of ceramic materials with a low thermal conductivity, for example, zirconia ceramic, etc.

Figure 6:
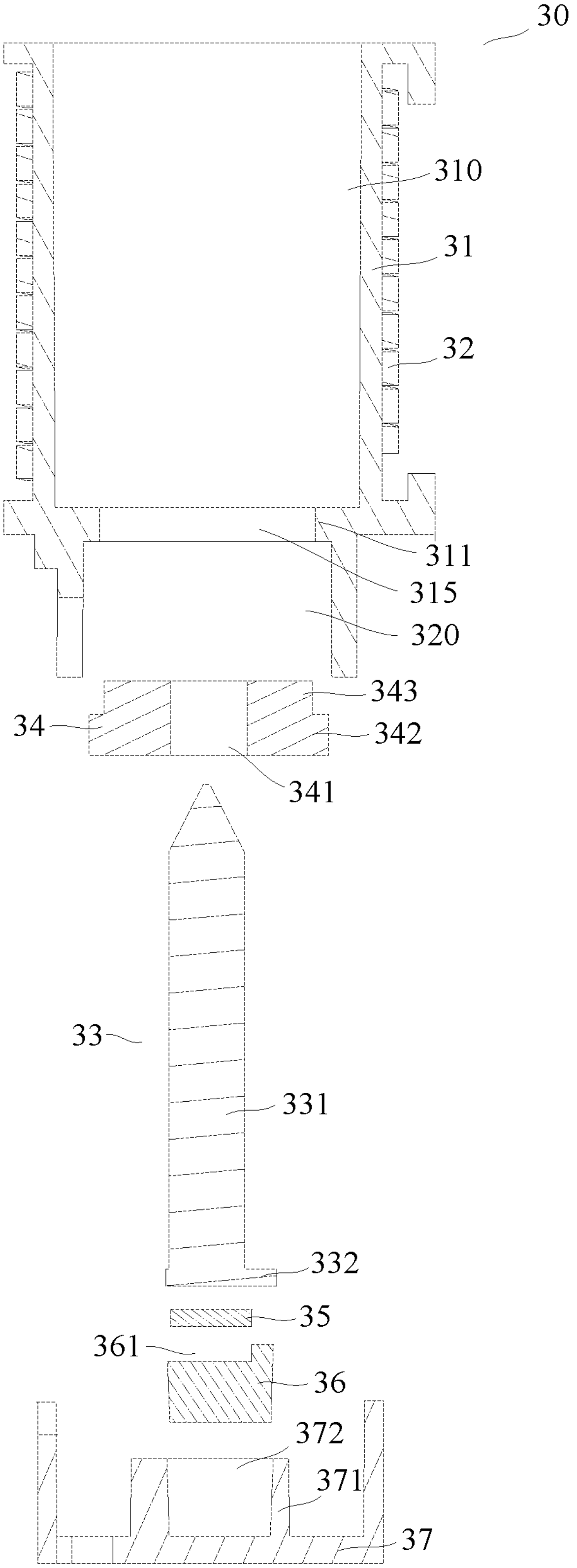
FIG. 6 is a sectional view, before assembly, of each part of the heating mechanism shown in FIG. 5.

According to the preferred embodiments shown in FIG. 4 and FIG. 6, after the second section 343 of the ceramic fixing seat 34 extends to the interior of the middle hole 315 of the separation portion 311, an upper end surface of the second section 343 is aligned to an upper end surface of the separation portion 311, avoiding the occurrence of a recess, formed due to different heights, which is easy to collect smoke residues fallen from the smokable material A or a condensed liquid of the aerosol and thus is inconvenient to clean.

After the heating portion of the susceptor 33 penetrates through the through hole 341 of the ceramic fixing seat 34, the base portion 332 abuts against a lower surface of the first section 342 so as to fix the susceptor 33.

Further, the installation space 320 is provided internally with a temperature sensor 35 that is located below the base portion 332 of the susceptor 33 and is tightly attached to the base portion 332 to sense a temperature of the susceptor 33, to facilitate the power control during the usage process.

Further, the installation space 320 is provided internally with a silicone rubber elastomer 36, which is installed below the temperature sensor 35 to provide an elastic force so that the temperature sensor 35 can be tightly attached to the base portion 332 of the susceptor 33, thereby preventing a gap occurring, due to untight connection, between the temperature sensor 35 and the susceptor 33 to impact the accuracy of the detection result of the temperature. In addition, in the preferred embodiment shown in FIG. 6, the silicone rubber elastomer 36 defines a recess 361 adapted to the temperature sensor 35, so that the temperature sensor 35 is retained within the recess 361 to be stably supported.

A lower end of the holder 31 is further provided with an end cover 37, which is configured to seal the lower end of the holder 31 and provide support for the silicone rubber elastomer 36, the temperature sensor 35, the ceramic fixing seat 34 and the susceptor 33, so that they can be stably packaged within the installation space 320 of the holder 31.

In the preferred embodiment shown in FIG. 6, the end cover 37 is provided with a ringlike wall 371 extending towards an interior of the installation space 320, an inner space of the wall 371 forms an accommodation chamber 372; during installation, the silicone rubber elastomer 36 is accommodated within the accommodation chamber 372 to be supported.

In the preferred embodiment shown in FIG. 5, the end cover 37 defines a clamping groove 371 thereon, an outer surface of the holder 31 is provided with a clamping protrusion adaptable to the clamping groove 371, such that the end cover 37 can be connected and fixed with the holder 31.

According to the preferred embodiment shown in FIG. 5, the temperature sensor 35 generally includes an elongated conductive pin 351 which is configured to supply power to the temperature sensor 35 and transmit a sensing signal; to facilitate the subsequent connection of the conductive pin 351 to a circuit board, the end cover 37 further defines a notch 372 thereon, for the conductive pin 351 to penetrate through to reach an exterior of the end cover 37 to connect to the circuit board.

Figure 7:
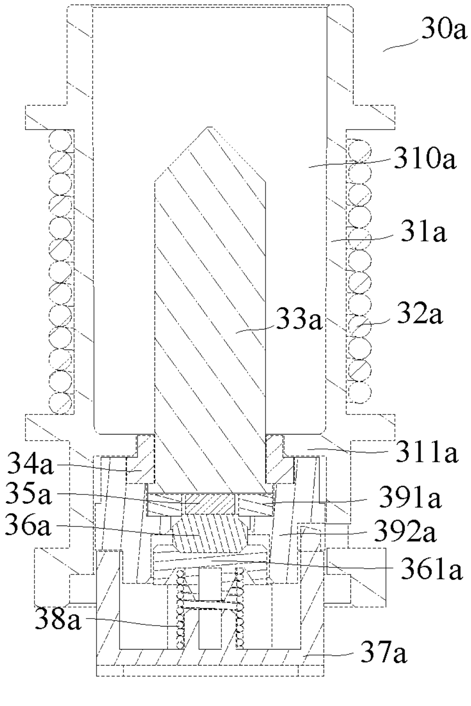
FIG. 7 is a sectional view of a heating mechanism according to anther embodiment.
Figure 8:
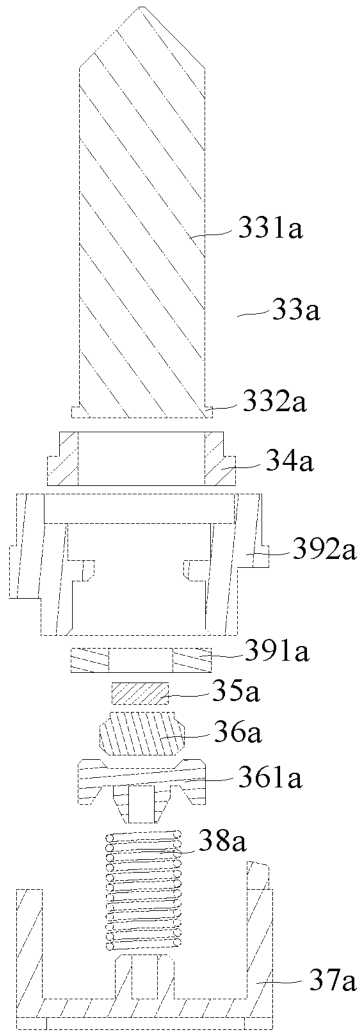
FIG. 8 is a sectional view, before assembly, of each part of the heating mechanism shown in FIG. 7.

The present disclosure further provides an embodiment of another preferred heating mechanism 30*a*, whose structure can refer to FIG. 7 to FIG. 8, including the following same structures as the above one embodiment:

- a holder 31*a* roughly in the shape of a tube having a hollow, wherein the holder 31*a* is provided internally with a separation portion 311*a* extending inwards in a radial direction, so that the internal hollow of the holder 31*a* is separated into a chamber 310*a* located above and configured to receive a smokable material A and an installation space located below and configured to install and retain reach part;
- an induction coil 32*a* wound on the holder 31*a*, which is configured to generate an alternating magnetic field when supplied with an alternating current;
- a bladed shaped susceptor 33*a*, which is inductively coupled with the alternating magnetic field generated by the induction coil 32*a* and may generate heat under the induction of the alternating magnetic field to heat the smokable material A. Specifically, the structure of the susceptor includes a heating portion 331*a* and a base portion 332*a*, wherein the heating portion 331*a* extends at least in part within the chamber 310*a*, and is inserted into the smokable material A to heat the smokable material A when the smokable material A is received within the chamber 310*a*; the base portion 332*a* is stably retained within the installation space so that the susceptor 33*a* is stably retained;
- a ceramic fixing seat 34*a*, which is penetrated by the susceptor 33*a* and abuts against the base portion 332*a*, so that the susceptor 33*a* is stably retained, and which at the same time separates the holder 31*a* from the susceptor 33*a*; in addition, during installation, the ceramic fixing seat 34*a* itself abuts against the separation portion 311*a* of the holder 31*a;*
- a temperature sensor 35*a*, which, after being installed, is tightly attached to a lower side of the base portion 332*a* so as to sense a temperature of the sensor 30*a;*
- a silicone rubber elastomer 36*a*, which is installed below the temperature sensor 35*a* to provide an elastic force, so that the temperature sensor 35*a* can be tightly attached to the base portion 332*a* of the susceptor 33*a*, thereby preventing a gap occurring, due to untight connection, between the temperature sensor 35*a* and the susceptor 33*a* to impact the accuracy of the detection result of the temperature; and
- an end cover 37*a*, which is configured to seal a lower end opening of the holder 31*a*.

Further, during the usage process, the silicone rubber elastomer 36*a* which is under the high temperature of the susceptor 30*a* for a long time will become aged and failed after a period of use and consequently will lose the effect of elastic support for the temperature sensor 35*a*; therefore, during the usage, the installation space is provided internally with a spring 38*a* which is configured to provide elastic support for the silicone rubber elastomer 36*a*, so that the silicone rubber elastomer 36*a*, after becoming aged, still makes the temperature sensor 35*a* tightly attached to the susceptor 30*a* under the action of the elastic support force.

Considering it is not easy to install and implement that the spring 38*a* directly elastically abuts against the silicone rubber elastomer 36*a*, a rigid silicone support seat 361*a*, as an auxiliary structure, is added that is located between the silicone rubber elastomer 36*a* and the spring 38*a*; the silicone rubber elastomer 36*a* is retained on an upper surface of the silicone support seat 361*a*, at the same time a lower surface of the silicone support seat 361*a* abuts against the spring 38*a*, so that the spring provides elastic support for the silicone rubber elastomer 36*a* through the silicone support seat 361*a*.

During implementations, the silicone support seat 361*a* and the end cover 37*a* are provided, respectively, with a corresponding convex column structure configured to facilitate installation of the spring 38*a*; the spring 38*a* is in the shape of a spiral extending in the axial direction of the holder 31*a*, so that two ends thereof are sleeved on corresponding convex columns respectively and abuts against the silicone support seat 361*a* and the end cover 37*a* so as to be stably installed within the holder 31*a*.

In the preferred embodiments shown in FIG. 7 and FIG. 8, to facilitate the installation of the temperature sensor 35*a*, the silicone rubber elastomer 36*a* and the spring 38*a*, inside the installation space are further provided:

a first fixing element 391*a*, in the shape of a hollow ring, configured to limit and fix the temperature sensor 35*a*, wherein the temperature sensor 35*a* is contained within the ringlike hollow of the first fixing element 391*a* to avoid moving in a radial direction of the holder 31*a*; and a second fixing element 392*a*, which is roughly configured as the shape of a hollow ring, wherein the ceramic fixing seat 34*a*, the temperature sensor 35*a*, the first fixing element 391*a*, the silicone rubber elastomer 36*a* are all accommodated and limited within the ringlike hollow.

It is to be noted that the description of the present disclosure and the drawings just list preferred embodiments of the present disclosure. The present disclosure may, however, be exemplified in many different forms and should not be construed as being limited to the specific embodiments set forth herein. These embodiments are not intended to form extra limits to the content of the present disclosure, rather, they are provided so that this disclosure will be thorough and complete. Moreover, the above technical features may continue to combine with each other to form various embodiments not listed above, and these embodiments are all intended to be covered by the description of the present disclosure. Further, for the ordinary staff in this field, multiple improvements or variations may be made according to the above description, and these improvements or variations are intended to be included within the scope of protection of the claims appended hereinafter.

What is claimed is:

1. An aerosol generating device, configured to heat a smokable material to generate an aerosol, comprising:

a holder, which is in the shape of a tube extending in a length direction, at least a portion of a tubular hollow of the holder forming a chamber to receive the smokable material;

an induction coil, which is arranged on the holder and configured to generate a varying magnetic field;

a susceptor, which is configured to be penetrated by the varying magnetic field to generate heat so as to heat the smokable material received within the chamber; the susceptor comprising a pin or blade shaped heating portion extending at least in part in an axial direction of the chamber and a base portion connected to the heating portion; and a ceramic fixing seat, which comprises a first side facing the chamber and a second side away from the chamber; wherein the heating portion penetrates the ceramic fixing seat from the second side towards the first side and extends at least in part to an interior of the chamber, and the base portion abuts against the ceramic fixing seat to prevent the susceptor from moving within the holder.

2. The aerosol generating device according to claim 1, wherein a separation portion that extends in a radial direction is arranged within the holder, to separate the tubular hollow of the holder into a first portion and a second portion that are located at two opposite sides of the separation portion in the axial direction; wherein the first portion is configured as the chamber to receive the smokable material; and the base portion of the susceptor is accommodated within the second portion.

3. The aerosol generating device according to claim 2, wherein the ceramic fixing seat is arranged within the second portion and abuts against the separation portion.

4. The aerosol generating device according to claim 1, wherein the susceptor does not contact the holder.

5. The aerosol generating device according to claim 3, wherein the separation portion is in the shape of a ring;

the ceramic fixing seat is in the shape of a cylinder extending in an axial direction of the holder and comprises a first section close to the chamber and a second section away from the chamber; the first section has a smaller outer diameter than the second section;

the first section extends at least in part to an interior of a ring-shaped hole in a middle part of the separation portion, and the second section abuts against the separation portion.

6. The aerosol generating device according to claim 5, wherein a surface of the first section opposite to the chamber is aligned to a surface of the separation portion opposite to the chamber.

7. The aerosol generating device according to claim 3, wherein a temperature sensor that is configured to sense a temperature of the susceptor is further arranged within the second portion; and the temperature sensor is arranged on one side of the base portion away from the chamber and abuts against the base portion.

8. The aerosol generating device according to claim 7, wherein an elastomer is further arranged within the second portion and configured to provide an elastic force so that the temperature sensor abuts against the base portion.

9. The aerosol generating device according to claim 8, wherein an end portion of the holder close to the second portion is further provided with an end cover that is configured to provide support for the elastomer.

10. The aerosol generating device according to claim 9, wherein the temperature sensor further comprises an elongated conductive pin;

the end cover defines an opening for the conductive pin to penetrate through to reach an exterior of the holder.

11. The aerosol generating device according to claim 8, wherein a spring is further arranged within the second portion and the spring is configured to provide elastic support for the elastomer so that the elastomer abuts against the temperature sensor.

12. The aerosol generating device according to claim 11, wherein the spring is configured as a spiral and extends in the axial direction of the holder;

the second portion is further provided with a support seat that is located between the elastomer and the spring in the axial direction of the holder, and the elastomer is retained on the support seat;

the spring abuts against the support seat so as to provide elastic support for the elastomer.

13. The aerosol generating device according to claim 1, wherein a temperature sensor, an elastomer and a spring are further arranged within the holder, wherein the temperature sensor is installed on one side of the base portion away from the chamber and abuts against the base portion to sense the temperature of the susceptor;

the elastomer is configured to provide an elastic force so that the temperature sensor abuts against the base portion; and the spring is configured to provide elastic support for the elastomer so that the elastomer abuts against the temperature sensor.

14. The aerosol generating device according to claim 2, wherein the susceptor does not contact the holder.

* * * * *